(12) United States Patent
Meiri et al.

(10) Patent No.: US 10,152,527 B1
(45) Date of Patent: Dec. 11, 2018

(54) INCREMENT RESYNCHRONIZATION IN HASH-BASED REPLICATION

(71) Applicant: EMC Corporation, Hopkinton, MA (US)

(72) Inventors: David Meiri, Cambridge, MA (US); Irit Lempel, Caesarea (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 178 days.

(21) Appl. No.: 14/979,890

(22) Filed: Dec. 28, 2015

(51) Int. Cl.
*G06F 17/30* (2006.01)

(52) U.S. Cl.
CPC .... *G06F 17/30575* (2013.01); *G06F 17/3033* (2013.01)

(58) Field of Classification Search
CPC .................................................. G06F 17/30575
See application file for complete search history.

(56) References Cited

U.S. PATENT DOCUMENTS

| | | | |
|---|---|---|---|
| 4,164,763 A | 8/1979 | Briccetti et al. | |
| 4,608,839 A | 9/1986 | Tibbals, Jr. | |
| 4,821,178 A | 4/1989 | Levin et al. | |
| 5,204,958 A | 4/1993 | Cheng et al. | |
| 5,319,645 A | 6/1994 | Bassi et al. | |
| 5,537,534 A | 7/1996 | Voigt et al. | |
| 5,539,907 A | 7/1996 | Srivastava et al. | |
| 5,627,995 A | 5/1997 | Miller et al. | |
| 5,694,619 A | 12/1997 | Konno | |
| 5,710,724 A | 1/1998 | Burrows | |
| 5,732,273 A | 3/1998 | Srivastava et al. | |
| 5,860,137 A | 1/1999 | Raz et al. | |
| 5,896,538 A | 4/1999 | Blandy et al. | |
| 5,903,730 A | 5/1999 | Asai et al. | |
| 5,940,618 A | 8/1999 | Blandy et al. | |
| 5,940,841 A | 8/1999 | Schmuck et al. | |
| 5,987,250 A | 11/1999 | Subrahmanyam | |
| 5,999,842 A | 12/1999 | Harrison et al. | |
| 6,085,198 A | 7/2000 | Skinner et al. | |
| 6,125,399 A | 9/2000 | Hamilton | |

(Continued)

FOREIGN PATENT DOCUMENTS

| EP | 1804157 | 7/2007 |
|---|---|---|
| JP | 2014-206884 | 10/2014 |

(Continued)

OTHER PUBLICATIONS

Response to U.S. Non-Final Office Action dated Jul. 6, 2017 for U.S. Appl. No. 14/494,895; Response filed Oct. 3, 2017; 10 Pages.

(Continued)

*Primary Examiner* — Syed H Hasan

(74) *Attorney, Agent, or Firm* — Daly, Crowley, Mofford & Durkee, LLP

(57) ABSTRACT

In one aspect, a method includes selecting a C-module; sending a write from a host to the selected C-module; selecting a D-module to commit a page related to the write; selecting a R-module to transmit data from the write to the target; writing the data from the write to target location; and writing the data to an address-to-hash table after acknowledgement that the data has been written to the target location and after the D-module acknowledges that the page is committed.

10 Claims, 6 Drawing Sheets

(56) References Cited

U.S. PATENT DOCUMENTS

| | | |
|---|---|---|
| 6,182,086 B1 | 1/2001 | Lomet et al. |
| 6,226,787 B1 | 5/2001 | Serra et al. |
| 6,327,699 B1 | 12/2001 | Larus et al. |
| 6,353,805 B1 | 3/2002 | Zahir et al. |
| 6,470,478 B1 | 10/2002 | Bargh et al. |
| 6,519,766 B1 | 2/2003 | Barritz et al. |
| 6,643,654 B1 | 11/2003 | Patel et al. |
| 6,654,948 B1 | 11/2003 | Konuru et al. |
| 6,658,471 B1 | 12/2003 | Berry et al. |
| 6,658,654 B1 | 12/2003 | Berry et al. |
| 6,671,694 B2 | 12/2003 | Baskins et al. |
| 6,691,209 B1 | 2/2004 | O'Connell |
| 6,801,914 B2 | 10/2004 | Barga et al. |
| 6,820,218 B1 | 11/2004 | Barga et al. |
| 6,870,929 B1 | 3/2005 | Greene |
| 7,099,797 B1 | 8/2006 | Richard |
| 7,143,410 B1 | 11/2006 | Coffman et al. |
| 7,203,796 B1 | 4/2007 | Muppalaneni et al. |
| 7,251,663 B1 | 7/2007 | Smith |
| 7,315,795 B2 | 1/2008 | Homma |
| 7,389,497 B1 | 6/2008 | Edmark et al. |
| 7,421,681 B2 | 9/2008 | DeWitt, Jr. et al. |
| 7,472,249 B2 | 12/2008 | Cholleti et al. |
| 7,552,125 B1 | 6/2009 | Evans |
| 7,574,587 B2 | 8/2009 | DeWitt, Jr. et al. |
| 7,672,005 B1 | 3/2010 | Hobbs et al. |
| 7,693,999 B2 | 4/2010 | Park |
| 7,714,747 B2 | 5/2010 | Fallon |
| 7,814,218 B1 | 10/2010 | Knee et al. |
| 7,827,136 B1 | 11/2010 | Wang et al. |
| 7,908,436 B1 | 3/2011 | Srinivasan et al. |
| 7,908,484 B2 | 3/2011 | Haukka et al. |
| 8,200,923 B1 | 6/2012 | Healey et al. |
| 8,335,899 B1 | 12/2012 | Meiri et al. |
| 8,386,425 B1 | 2/2013 | Kadayam et al. |
| 8,386,433 B1 | 2/2013 | Kadayam |
| 8,478,951 B1 | 7/2013 | Healey et al. |
| 8,799,705 B2 | 8/2014 | Hallak et al. |
| 8,880,788 B1 | 11/2014 | Sundaram et al. |
| 9,037,822 B1 | 5/2015 | Meiri et al. |
| 9,104,326 B2 | 8/2015 | Frank et al. |
| 9,128,942 B1 | 9/2015 | Pfau et al. |
| 9,208,162 B1 | 12/2015 | Hallak et al. |
| 9,270,592 B1 | 2/2016 | Sites |
| 9,286,003 B1 | 3/2016 | Hallak et al. |
| 9,304,889 B1 | 4/2016 | Chen et al. |
| 9,330,048 B1 | 5/2016 | Bhatnagar et al. |
| 9,342,465 B1 | 5/2016 | Meiri |
| 9,367,398 B1 | 6/2016 | Ben-Moshe et al. |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,552,242 B1* | 1/2017 | Leshinsky ............ G06F 11/0727 |
| 9,703,789 B2 | 7/2017 | Bowman et al. |
| 9,760,596 B2* | 9/2017 | Burchall ............ G06F 17/30377 |
| 9,762,460 B2 | 9/2017 | Pawlowski et al. |
| 9,769,254 B2 | 9/2017 | Gilbert et al. |
| 9,785,468 B2 | 10/2017 | Mitchell et al. |
| 2002/0029214 A1* | 3/2002 | Yianilos ............ G06F 17/30327 |
| 2002/0056031 A1 | 5/2002 | Skiba et al. |
| 2002/0087500 A1* | 7/2002 | Berkowitz ........ G06F 17/30348 |
| 2002/0133512 A1 | 9/2002 | Milillo et al. |
| 2003/0023656 A1 | 1/2003 | Hutchison et al. |
| 2003/0061227 A1 | 3/2003 | Baskins et al. |
| 2003/0079041 A1 | 4/2003 | Parrella, Sr. et al. |
| 2003/0126122 A1 | 7/2003 | Bosley et al. |
| 2003/0145251 A1 | 7/2003 | Cantrill |
| 2004/0030721 A1 | 2/2004 | Kruger et al. |
| 2004/0225813 A1* | 11/2004 | Ervin ................ G06F 13/4045 710/305 |
| 2004/0225814 A1* | 11/2004 | Ervin ................ G06F 13/4045 710/305 |
| 2004/0267835 A1* | 12/2004 | Zwilling ............ G06F 11/1451 |
| 2005/0039171 A1 | 2/2005 | Avakian et al. |
| 2005/0102547 A1 | 5/2005 | Keeton et al. |
| 2005/0125626 A1 | 6/2005 | Todd |
| 2005/0144416 A1 | 6/2005 | Lin |
| 2005/0171937 A1 | 8/2005 | Hughes et al. |
| 2005/0177603 A1 | 8/2005 | Shavit |
| 2005/0193084 A1 | 9/2005 | Todd et al. |
| 2005/0278346 A1 | 12/2005 | Shang et al. |
| 2006/0031653 A1 | 2/2006 | Todd et al. |
| 2006/0031787 A1 | 2/2006 | Ananth et al. |
| 2006/0047776 A1 | 3/2006 | Chieng et al. |
| 2006/0070076 A1 | 3/2006 | Ma |
| 2006/0106747 A1* | 5/2006 | Bartfai ................ G06F 11/2064 |
| 2006/0123212 A1 | 6/2006 | Yagawa |
| 2006/0242442 A1 | 10/2006 | Armstrong et al. |
| 2006/0271540 A1 | 11/2006 | Williams |
| 2007/0043531 A1* | 2/2007 | Kosche ............... G06F 11/3447 702/182 |
| 2007/0078982 A1 | 4/2007 | Aidun et al. |
| 2007/0208788 A1 | 9/2007 | Chakravarty et al. |
| 2007/0240125 A1 | 10/2007 | Degenhardt et al. |
| 2007/0297434 A1 | 12/2007 | Arndt et al. |
| 2008/0065864 A1* | 3/2008 | Akkary ................ G06F 9/3834 712/225 |
| 2008/0082736 A1 | 4/2008 | Chow et al. |
| 2008/0082969 A1 | 4/2008 | Agha et al. |
| 2008/0098183 A1 | 4/2008 | Morishita et al. |
| 2008/0163215 A1 | 7/2008 | Jiang et al. |
| 2008/0178050 A1 | 7/2008 | Kern et al. |
| 2008/0235793 A1 | 9/2008 | Schunter et al. |
| 2008/0243952 A1 | 10/2008 | Webman et al. |
| 2008/0288739 A1 | 11/2008 | Bamba et al. |
| 2009/0006745 A1 | 1/2009 | Cavallo et al. |
| 2009/0030986 A1 | 1/2009 | Bates |
| 2009/0049450 A1 | 2/2009 | Dunshea et al. |
| 2009/0055447 A1 | 2/2009 | Sudhakar |
| 2009/0055613 A1 | 2/2009 | Maki et al. |
| 2009/0089483 A1 | 4/2009 | Tanaka et al. |
| 2009/0100108 A1 | 4/2009 | Chen et al. |
| 2009/0172273 A1 | 7/2009 | Piszczek et al. |
| 2009/0216953 A1 | 8/2009 | Rossi |
| 2009/0222536 A1 | 9/2009 | Flynn et al. |
| 2009/0240664 A1* | 9/2009 | Dinker ................ G06F 12/0842 |
| 2009/0240869 A1* | 9/2009 | O'Krafka ............ G06F 12/0284 711/103 |
| 2009/0248986 A1 | 10/2009 | Citron et al. |
| 2009/0319996 A1 | 12/2009 | Shafi et al. |
| 2010/0005233 A1 | 1/2010 | Hosokawa |
| 2010/0042790 A1 | 2/2010 | Mondal et al. |
| 2010/0088296 A1 | 4/2010 | Periyagaram et al. |
| 2010/0161884 A1 | 6/2010 | Kurashige |
| 2010/0180145 A1 | 7/2010 | Chu |
| 2010/0199066 A1 | 8/2010 | Artan et al. |
| 2010/0205330 A1 | 8/2010 | Noborikawa et al. |
| 2010/0223619 A1 | 9/2010 | Jaquet et al. |
| 2010/0250611 A1 | 9/2010 | Krishnamurthy |
| 2010/0257149 A1 | 10/2010 | Cognigni et al. |
| 2010/0287427 A1 | 11/2010 | Kim et al. |
| 2011/0060722 A1 | 3/2011 | Li et al. |
| 2011/0078494 A1 | 3/2011 | Maki et al. |
| 2011/0083026 A1 | 4/2011 | Mikami et al. |
| 2011/0087854 A1 | 4/2011 | Rushworth et al. |
| 2011/0099335 A1* | 4/2011 | Scott .................. G06F 12/0842 711/141 |
| 2011/0099342 A1 | 4/2011 | Ozdemir |
| 2011/0119679 A1 | 5/2011 | Muppirala et al. |
| 2011/0126045 A1 | 5/2011 | Bennett |
| 2011/0131375 A1* | 6/2011 | Noeldner ............. G06F 12/00 711/114 |
| 2011/0137916 A1 | 6/2011 | Deen et al. |
| 2011/0145516 A1* | 6/2011 | Adl-Tabatabai ........ G06F 8/458 711/152 |
| 2011/0161297 A1 | 6/2011 | Parab |
| 2011/0202744 A1 | 8/2011 | Kulkarni et al. |
| 2011/0219188 A1* | 9/2011 | Blumrich ............ G06F 12/08 711/119 |
| 2011/0219208 A1* | 9/2011 | Asaad ..................... G06F 15/76 712/12 |
| 2011/0225122 A1 | 9/2011 | Denuit et al. |

(56) References Cited

U.S. PATENT DOCUMENTS

| | | | |
|---|---|---|---|
| 2011/0252099 A1* | 10/2011 | Pattekar | G06F 17/30371 709/206 |
| 2011/0289291 A1 | 11/2011 | Agombar et al. | |
| 2011/0302587 A1 | 12/2011 | Nishikawa et al. | |
| 2011/0307447 A1* | 12/2011 | Sabaa | H04L 67/2842 707/637 |
| 2011/0307659 A1* | 12/2011 | Hans | G06F 3/0613 711/114 |
| 2012/0017037 A1* | 1/2012 | Riddle | G06F 17/30519 711/103 |
| 2012/0023384 A1 | 1/2012 | Naradasi et al. | |
| 2012/0054472 A1 | 3/2012 | Altman et al. | |
| 2012/0059799 A1 | 3/2012 | Oliveira et al. | |
| 2012/0078852 A1 | 3/2012 | Haselton et al. | |
| 2012/0124282 A1 | 5/2012 | Frank et al. | |
| 2012/0158736 A1 | 6/2012 | Milby | |
| 2012/0204077 A1 | 8/2012 | D'Abreu et al. | |
| 2012/0210095 A1* | 8/2012 | Nellans | G06F 12/10 711/206 |
| 2012/0233432 A1 | 9/2012 | Feldman et al. | |
| 2012/0278793 A1 | 11/2012 | Jalan et al. | |
| 2012/0290546 A1 | 11/2012 | Smith et al. | |
| 2012/0290798 A1 | 11/2012 | Huang et al. | |
| 2012/0290821 A1* | 11/2012 | Shah | G06F 9/3806 712/240 |
| 2012/0304024 A1 | 11/2012 | Rohleder et al. | |
| 2012/0309539 A1* | 12/2012 | Smith | A63F 13/795 463/42 |
| 2012/0310956 A1* | 12/2012 | Huhn | G06Q 30/0269 707/754 |
| 2012/0310959 A1* | 12/2012 | Huhn | G06F 17/30339 707/756 |
| 2012/0311036 A1* | 12/2012 | Huhn | G06Q 10/10 709/204 |
| 2013/0031077 A1 | 1/2013 | Liu et al. | |
| 2013/0036289 A1 | 2/2013 | Welnicki et al. | |
| 2013/0054524 A1 | 2/2013 | Anglin et al. | |
| 2013/0073527 A1 | 3/2013 | Bromley | |
| 2013/0110783 A1 | 5/2013 | Wertheimer et al. | |
| 2013/0111007 A1 | 5/2013 | Hoffmann et al. | |
| 2013/0124798 A1* | 5/2013 | Aszmann | G06F 3/0689 711/114 |
| 2013/0138607 A1 | 5/2013 | Bashyam et al. | |
| 2013/0151683 A1 | 6/2013 | Jain et al. | |
| 2013/0151759 A1 | 6/2013 | Shim et al. | |
| 2013/0198854 A1 | 8/2013 | Erway et al. | |
| 2013/0212068 A1* | 8/2013 | Talius | G06F 17/30088 707/639 |
| 2013/0212074 A1 | 8/2013 | Romanski et al. | |
| 2013/0212321 A1* | 8/2013 | Talagala | G06F 12/0246 711/103 |
| 2013/0227346 A1 | 8/2013 | Lee | |
| 2013/0246354 A1 | 9/2013 | Clayton et al. | |
| 2013/0246709 A1* | 9/2013 | Segelken | G06F 9/30174 711/125 |
| 2013/0246724 A1 | 9/2013 | Furuya | |
| 2013/0265883 A1 | 10/2013 | Henry et al. | |
| 2013/0275715 A1* | 10/2013 | Caprioli | G06F 12/10 711/203 |
| 2013/0282997 A1 | 10/2013 | Suzuki et al. | |
| 2013/0290285 A1 | 10/2013 | Gopal et al. | |
| 2013/0305002 A1 | 11/2013 | Hallak et al. | |
| 2013/0318051 A1 | 11/2013 | Kumar et al. | |
| 2013/0318053 A1 | 11/2013 | Provenzano et al. | |
| 2013/0326318 A1 | 12/2013 | Haswell | |
| 2013/0332610 A1 | 12/2013 | Beveridge | |
| 2013/0339533 A1 | 12/2013 | Neerincx et al. | |
| 2013/0346716 A1 | 12/2013 | Resch | |
| 2014/0019764 A1 | 1/2014 | Gopal et al. | |
| 2014/0032964 A1 | 1/2014 | Neerincx et al. | |
| 2014/0032992 A1 | 1/2014 | Hara et al. | |
| 2014/0040199 A1 | 2/2014 | Golab et al. | |
| 2014/0040343 A1 | 2/2014 | Nickolov et al. | |
| 2014/0082261 A1 | 3/2014 | Cohen et al. | |
| 2014/0082327 A1* | 3/2014 | Ghose | G06F 9/3877 712/205 |
| 2014/0122823 A1 | 5/2014 | Gupta et al. | |
| 2014/0136759 A1 | 5/2014 | Sprouse et al. | |
| 2014/0143206 A1 | 5/2014 | Pittelko | |
| 2014/0149664 A1 | 5/2014 | Ezra et al. | |
| 2014/0161348 A1 | 6/2014 | Sutherland et al. | |
| 2014/0181119 A1* | 6/2014 | Chiueh | G06F 17/30097 707/747 |
| 2014/0195480 A1* | 7/2014 | Talagala | G06F 12/0804 707/610 |
| 2014/0195484 A1 | 7/2014 | Wang et al. | |
| 2014/0195725 A1* | 7/2014 | Bennett | G06F 12/0246 711/103 |
| 2014/0237201 A1 | 8/2014 | Swift | |
| 2014/0244598 A1 | 8/2014 | Haustein et al. | |
| 2014/0279900 A1* | 9/2014 | Gupta | G06F 17/30309 707/634 |
| 2014/0279920 A1* | 9/2014 | Madhavarapu | G06F 17/30283 707/649 |
| 2014/0279929 A1* | 9/2014 | Gupta | G06F 11/1471 707/683 |
| 2014/0297588 A1 | 10/2014 | Babashetty et al. | |
| 2014/0359231 A1 | 12/2014 | Matthews | |
| 2014/0380282 A1 | 12/2014 | Ravindranath Sivalingam et al. | |
| 2015/0006910 A1 | 1/2015 | Shapiro | |
| 2015/0019507 A1 | 1/2015 | Aronovich | |
| 2015/0067231 A1* | 3/2015 | Sundarrajan | G06F 3/065 711/103 |
| 2015/0088823 A1 | 3/2015 | Chen et al. | |
| 2015/0098563 A1 | 4/2015 | Gulley et al. | |
| 2015/0112933 A1 | 4/2015 | Satapathy | |
| 2015/0134880 A1 | 5/2015 | Danilak et al. | |
| 2015/0134902 A1 | 5/2015 | Goodman et al. | |
| 2015/0149739 A1 | 5/2015 | Seo et al. | |
| 2015/0149789 A1 | 5/2015 | Seo et al. | |
| 2015/0161194 A1 | 6/2015 | Provenzano et al. | |
| 2015/0186215 A1 | 7/2015 | Das Sharma et al. | |
| 2015/0193342 A1 | 7/2015 | Ohara et al. | |
| 2015/0199244 A1 | 7/2015 | Venkatachalam et al. | |
| 2015/0205663 A1 | 7/2015 | Sundaram et al. | |
| 2015/0205816 A1 | 7/2015 | Periyagaram et al. | |
| 2015/0249615 A1 | 9/2015 | Chen et al. | |
| 2015/0278329 A1* | 10/2015 | Hrle | G06F 17/30575 707/615 |
| 2015/0324236 A1 | 11/2015 | Gopalan et al. | |
| 2016/0004642 A1 | 1/2016 | Sugimoto et al. | |
| 2016/0011941 A1 | 1/2016 | He et al. | |
| 2016/0034692 A1 | 2/2016 | Singler | |
| 2016/0042285 A1 | 2/2016 | Gilenson et al. | |
| 2016/0062853 A1 | 3/2016 | Sugabrahmam et al. | |
| 2016/0080482 A1 | 3/2016 | Gilbert et al. | |
| 2016/0110252 A1 | 4/2016 | Hyun et al. | |
| 2016/0132270 A1 | 5/2016 | Miki | |
| 2016/0147814 A1* | 5/2016 | Goel | G06F 17/30368 707/600 |
| 2016/0170884 A1* | 6/2016 | Eddy | G06F 12/0811 711/122 |
| 2016/0171372 A1* | 6/2016 | Fraleigh | G06N 5/022 706/59 |
| 2016/0188419 A1 | 6/2016 | Dagar et al. | |
| 2016/0350391 A1 | 12/2016 | Vijayan et al. | |
| 2016/0359968 A1 | 12/2016 | Chitti et al. | |
| 2016/0366206 A1 | 12/2016 | Shemer et al. | |
| 2017/0091226 A1* | 3/2017 | Kharatishvili | G06F 17/30283 |
| 2017/0123704 A1 | 5/2017 | Sharma et al. | |
| 2017/0123995 A1 | 5/2017 | Freyensee et al. | |
| 2017/0139786 A1 | 5/2017 | Simon et al. | |
| 2017/0161348 A1 | 6/2017 | Araki et al. | |
| 2017/0206236 A1* | 7/2017 | Kharatishvili | G06F 17/30368 |
| 2017/0255515 A1 | 9/2017 | Kim et al. | |

FOREIGN PATENT DOCUMENTS

| | | |
|---|---|---|
| WO | WO 2010/019596 | 2/2010 |

(56) References Cited

FOREIGN PATENT DOCUMENTS

WO  WO 2010/040078  4/2010
WO  WO 2012/066528  5/2012

OTHER PUBLICATIONS

Response to U.S. Non-Final Office Action dated Feb. 9, 2017 for U.S. Appl. No. 14/228,971; Response filed on May 9, 2017; 12 Pages.
U.S. Non-Final Office Action dated Jun. 2, 2017 for U.S. Appl. No. 15/079,208; 19 Pages.
Response to U.S. Non-Final Office Action dated Jul. 27, 2017 for U.S. Appl. No. 14/228,360; Response filed Oct. 26, 2017; 13 pages.
U.S. Non-Final Office Action dated Oct. 4, 2017 for U.S. Appl. No. 14/228,971; 37 pages.
U.S. Non-Final Office Action dated Sep. 22, 2016 for U.S. Appl. No. 15/001,784; 27 Pages.
Response to U.S. Non-Final Office Action dated Sep. 22, 2016 for U.S. Appl. No. 15,001,784; Response filed on Dec. 8, 2016; 16 Pages.
U.S. Non-Final Office Action dated Sep. 9, 2016 for U.S. Appl. No. 15/001,789; 29 Pages.
U.S. Appl. No. 15/282,546, filed Sep. 30, 2016, Kucherov et al.
U.S. Appl. No. 15/281,593, filed Sep. 30, 2016, Braunschvig et al.
U.S. Appl. No. 15/281,597, filed Sep. 30, 2016, Bigman.
Response to U.S. Non-Final Office Action dated Sep. 9, 2016 for U.S. Appl. No. 15/001,789; Response filed on Dec. 8, 2016; 15 Pages.
U.S. Final Office Action dated Nov. 16, 2016 for U.S. Appl. No. 14/230,405; 23 Pages.
Response to U.S. Final Office Action dated Nov. 16, 2016 for U.S. Appl. No. 14/230,405; Response filed on Dec. 1, 2016; 8 Pages.
Notice of Allowance dated Jan. 25, 2017 for U.S. Appl. No. 14/230,405; 8 Pages.
U.S. Final Office Action dated Oct. 4, 2016 for U.S. Appl. No. 14/228,971; 39 Pages.
Request for Continued Examination and Response to U.S. Final Office Action dated Oct. 4, 2016 for U.S. Appl. No. 14/228,971; Response filed on Jan. 4, 2017; 19 Pages.
U.S. Appl. No. 15/079,205, filed Mar. 24, 2016, Dorfman et al.
U.S. Appl. No. 15/079,208, filed Mar. 24, 2016, Ben-Moshe et al.
U.S. Appl. No. 15/079,213, filed Mar. 24, 2016, Ben-Moshe et al.
U.S. Appl. No. 15/079,215, filed Mar. 24, 2016, Krakov et al.
U.S. Appl. No. 15/196,674, filed Jun. 29, 2016, Kleiner et al.
U.S. Appl. No. 15/196,427, filed Jun. 29, 2016, Shveidel.
U.S. Appl. No. 15/196,374, filed Jun. 29, 2016, Shveidel et al.
U.S. Appl. No. 15/196,447, filed Jun. 29, 2016, Shveidel et al.
U.S. Appl. No. 15/196,472, filed Jun. 29, 2016, Shveidel.
Response to U.S. Final Office Action dated Apr. 6, 2016 corresponding to U.S. Appl. No. 14/034,981; Response filed on Jun. 16, 2016; 11 Pages.
Notice of Allowance dated Jun. 29, 2016 corresponding to U.S. Appl. No. 14/034,981; 14 Pages.
Notice of Allowance dated May 20, 2016 corresponding to U.S. Appl. No. 14/037,577; 19 Pages.
Request for Continued Examination (RCE) and Response to Final Office Action dated Feb. 25, 2016 corresponding to U.S. Appl. No. 14/228,971; Response filed on May 25, 2016; 12 Pages.
U.S. Office Action dated Jun. 10, 2016 corresponding to U.S. Appl. No. 14/228,971; 27 Pages.
Response to U.S. Office Action dated Jun. 10, 2016 corresponding to U.S. Appl. No. 14/228,971; Response filed on Aug. 17, 2016; 10 Pages.
U.S. Office Action dated Sep. 22, 2015 corresponding to U.S. Appl. No. 14/228,982; 17 Pages.
Response to U.S. Office Action dated Sep. 22, 2015 corresponding to U.S. Appl. No. 14/228,982; Response filed on Feb. 1, 2016; 10 Pages.

Notice of Allowance dated Apr. 26, 2016 corresponding to U.S. Appl. No. 14/228,982; 9 Pages.
U.S. Office Action dated Jan. 12, 2016 corresponding to U.S. Appl. No. 14/229,491; 12 Pages.
Response to Office Action dated Jan. 12, 2016 corresponding to U.S. Appl. No. 14/229,491; Response filed on Jun. 2, 2016; 7 Pages.
Notice of Allowance dated Jul. 25, 2016 corresponding to U.S. Appl. No. 14/229,491; 10 Pages.
U.S. Final Office Action dated Jul. 29, 2016 corresponding to U.S. Appl. No. 14/230,405; 29 Pages.
Notice of Allowance dated Jun. 6, 2016 corresponding to U.S. Appl. No. 14/317,449; 43 Pages.
EMC Corporation, "Introduction to the EMC XtremIO Storage Array;" Version 4.0; White Paper—A Detailed Review; Apr. 2015; 65 Pages.
Vijay Swami, "XtremIO Hardware/Software Overview & Architecture Deepdive;" EMC On-Line Blog; Nov. 13, 2013; Retrieved from <http://vjswami.com/2013/11/13/xtremio-hardwaresoftware-overview-architecture-deepdive/>; 18 Pages.
U.S. Non-Final Office Action dated Apr. 21, 2017 for U.S. Appl. No. 15/079,215; 53 Pages.
Response filed on May 2, 2016 to the Non-Final Office Action of Dec. 1, 2015; for U.S. Appl. No. 14/230,405; 8 pages.
Response filed on May 2, 2016 to the Non-Final Office Action of Feb. 4, 2016; for U.S. Appl. No. 14/037,577; 10 pages.
Final Office Action dated Feb. 25, 2016 corresponding to U.S. Appl. No. 14/228,971; 27 Pages.
Notice of Allowance dated Feb. 26, 2016 corresponding to U.S. Appl. No. 14/230,414; 8 Pages.
U.S. Non-Final Office Action dated Jul. 6, 2017 for U.S. Appl. No. 14/494,895; 36 Pages.
Notice of Allowance dated Jul. 6, 2017 for U.S. Appl. No. 14/496,359; 28 Pages.
U.S. Final Office Action dated Jun. 20, 2017 for U.S. Appl. No. 14/228,971; 40 Pages.
Response (w/RCE) to U.S. Final Office Action dated Mar. 9, 2017 for U.S. Appl. No. 15/001,789, filed Jun. 9, 2017; 15 Pages.
Notice of Allowance dated Sep. 22, 2017 for U.S. Appl. No. 15/079,215; 9 Pages.
Response (w/RCE) to U.S. Final Office Action dated Jun. 20, 2017 for U.S. Appl. No. 14/228,971, filed Sep. 13, 2017; 14 Pages.
U.S. Non-Final Office Action dated Feb. 9, 2017 for U.S. Appl. No. 14/228,971; 38 Pages.
Response to Office Action filed on Oct. 26, 2017 for U.S. Appl. No. 14/228,360; 13 pages.
U.S. Appl. No. 15/085,168, filed Mar. 30, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
U.S. Final Office Action dated Mar. 9, 2017 for U.S. Appl. No. 15/001,789; 40 Pages.
U.S. Final Office Action dated Feb. 22, 2017 for U.S. Appl. No. 15/001,784; 15 Pages.
Response to U.S. Non-Final Office Action dated Apr. 21, 2017 for U.S. Appl. No. 15/079,215; Response filed on Jul. 21, 2017; 9 Pages.
U.S. Non-Final Office Action dated Jul. 27, 2017 for U.S. Appl. No. 14/228,360; 52 Pages.
Final Office Action dated Apr. 6, 2016 corresponding to U.S. Appl. No. 14/034,981; 38 Pages.
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
PCT International Search Report and Written Opinion dated Dec. 1, 2011 for PCT Application No. PCT/IL2011/000692; 11 Pages.

(56) References Cited

OTHER PUBLICATIONS

PCT International Preliminary Report dated May 30, 2013 for PCT Patent Application No. PCT/IL2011/000692; 7 Pages.
U.S. Appl. No. 14/228,971, filed Mar. 28, 2014, Shoikhet et al.
U.S. Appl. No. 14/228,360, filed Mar. 28, 2014, Lempel et al.
U.S. Appl. No. 14/496,359, filed Sep. 25, 2014, Love et al.
U.S. Appl. No. 12/945,915; 200 Pages.
U.S. Appl. No. 12/945,915; 108 Pages.
U.S. Appl. No. 12/945,915; 67 Pages.
Nguyen et al., "B+ Hash Tree: Optimizing Query Execution Times for on-Disk Semantic Web Data Structures;" Proceedings of the $6^{th}$ International Workshop on Scalable Semantic Web Knowledge Base Systems; Shanghai, China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,981; 28 Pages.
Response to Office Action dated Jul. 22, 2015 corresponding to U.S. Appl. No. 14/034,981, filed Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed on Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405; Response filed Oct. 6, 2015; 1 Page.
Office Action dated Dec. 1, 2015 corresponding to U.S. Appl. No. 14/230,405; 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899; 19 Pages.
Office Action dated Aug. 27, 2015 corresponding to U.S. Appl. No. 14/228,971; 23 Pages.
Response to Office Action dated Aug. 27, 2015 corresponding to U.S. Appl. No. 14/228,971; Response filed on Jan. 14, 2016; 10 Pages.
U.S. Final Office Action dated May 10, 2018 for U.S. Appl. No. 14/228,360; 43 Pages.
Notice of Allowance dated May 8, 2018 for U.S. Appl. No. 15/001,784; 9 Pages.
Response to U.S. Non-Final Office Action dated Dec. 29, 2017 for U.S. Appl. No. 15/079,208; Response filed Apr. 30, 2018; 7 Pages.
Response to U.S. Non-Final Office Action dated Dec. 22, 2017 for U.S. Appl. No. 15/282,546; Response filed May 17, 2018; 8 Pages.
U.S. Non-Final Office Action dated Jan. 11, 2018 corresponding to U.S. Appl. No. 15/085,168; 14 Pages.
U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.
U.S. Final Office Action dated Apr. 18, 2018 for U.S. Appl. No. 15/001,789; 27 Pages.
Notice of Allowance dated Apr. 18, 2018 for U.S. Appl. No. 14/494,895; 8 Pages.
U.S. Non-Final Office Action dated Oct. 31, 2017 for U.S. Appl. No. 15/001,789; 38 pages.
U.S. Final Office Action dated May 29, 2018 for U.S. Appl. No. 14/228,971; 35 pages.
U.S. Non-Final Office Action dated May 31, 2018 for U.S. Appl. No. 15/281,593; 10 pages.
Office Action dated Nov. 1, 2017 corresponding to U.S. Appl. No. 15/196,374; 64 Pages.
U.S. Notice of Allowance dated Jan. 26, 2018 corresponding to U.S. Appl. No. 15/085,172; 8 Pages.
Response to U.S. Non-Final Office Action dated Oct. 31, 2017 corresponding to U.S. Appl. No. 15/001,789; Response filed Jan. 30, 2018; 9 Pages.
Response to U.S. Non-Final Office Action dated Nov. 1, 2017 corresponding to U.S. Appl. No. 15/196,374; Response filed Jan. 30, 2018; 14 Pages.
U.S. Notice of Allowance dated Jan. 24, 2018 corresponding to U.S. Appl. No. 15/085,181; 8 Pages.
Response to U.S. Non-Final Office Action dated Oct. 4, 2017 corresponding to U.S. Appl. No. 14/228,971; Response filed Jan. 26, 2018; 11 Pages.
U.S. Notice of Allowance dated Feb. 21, 2018 corresponding to U.S. Appl. No. 15/196,427; 31 Pages.
Response to U.S. Non-Final Office Action dated Nov. 13, 2017 for U.S. Appl. No. 15/079,213; Response filed Feb. 13, 2018; 9 Pages.
Response to U.S. Non-Final Office Action dated Nov. 28, 2017 for U.S. Appl. No. 15/079,205; Response filed Feb. 28, 2018; 11 Pages.
U.S. Non-Final Office Action dated Dec. 11, 2017 for U.S. Appl. No. 15/196,447; 54 Pages.
U.S. Non-Final Office Action dated Dec. 14, 2017 for U.S. Appl. No. 15/076,946; 28 Pages.
U.S. Non-Final Office Action dated Nov. 28, 2017 corresponding to U.S. Appl. No. 15/079,205; 9 Pages.
U.S. Non-Final Office Action dated Dec. 29, 2017 corresponding to U.S. Appl. No. 15/079,208; 10 Pages.
U.S. Non-Final Office Action dated Dec. 22, 2017 corresponding to U.S. Appl. No. 15/282,546; 12 Pages.
Office Action dated Dec. 14, 2017 from U.S. Appl. No. 15/076,946; 40 Pages.
Request for Continued Examination dated Dec. 4, 2017 for U.S. Appl. No. 15/001,784; 3 Pages.
Notice of Allowance dated Nov. 28, 2017 for U.S. Appl. No. 15/001,784; 9 Pages.
U.S. Final Office Action dated Nov. 2, 2017 for U.S. Appl. No. 14/494,895; 12 Pages.
Response to Final Office Action dated Apr. 18, 2018 for U.S. Appl. No. 15/001,789, filed Aug. 20, 2018; 11 Pages.
U.S. Non-Final Office Action dated Nov. 13, 2017 for U.S. Appl. No. 15/079,213; 9 pages.

* cited by examiner

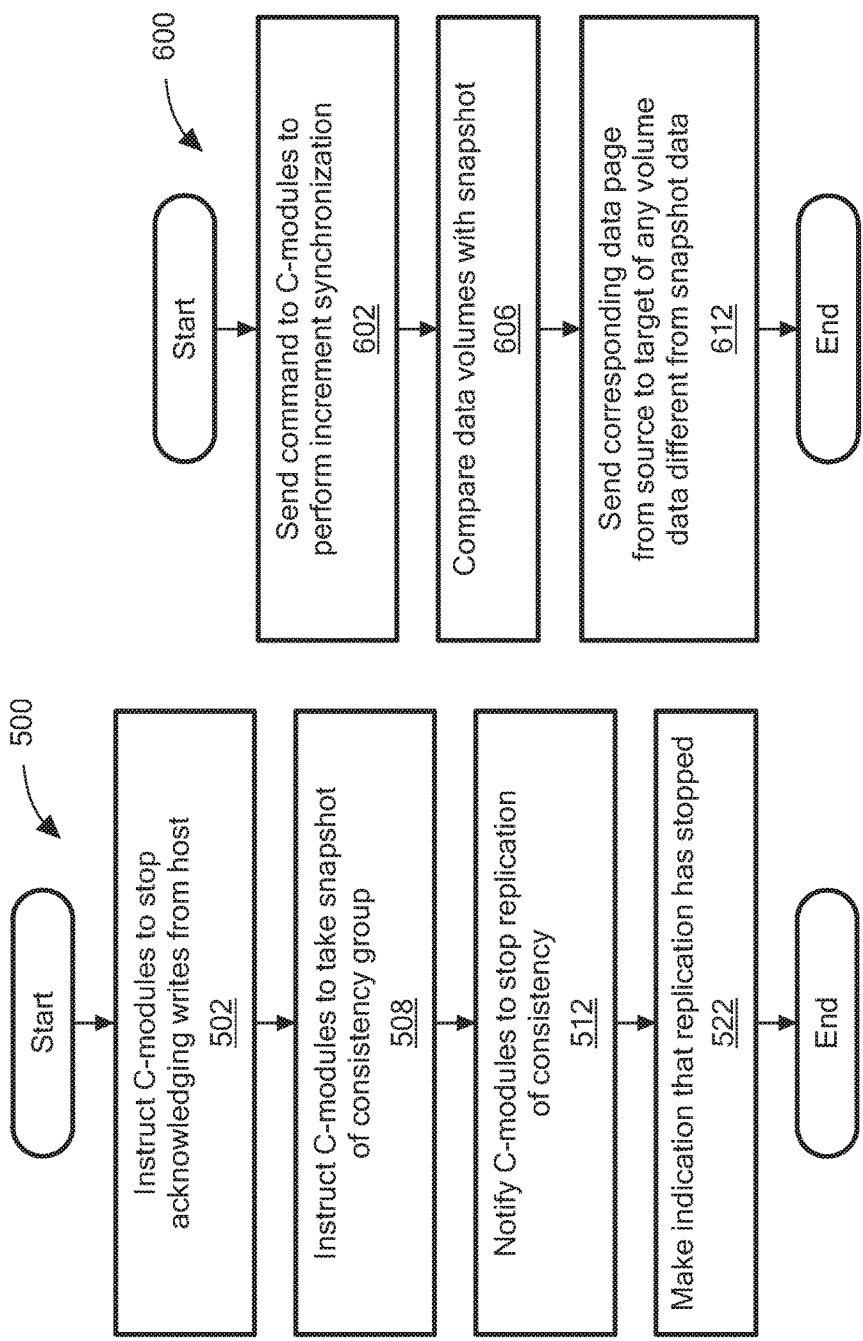

INCREMENT RESYNCHRONIZATION IN HASH-BASED REPLICATION

BACKGROUND

Storage systems in general, and block based storage systems specifically, are a key element in modern data centers and computing infrastructure. These systems are designed to store and retrieve large amounts of data, by providing data block address and data block content—for storing a block of data—and by providing a data block address for retrieval of the data block content that is stored at the specified address.

Storage solutions are typically partitioned into categories based on a use case and application within a computing infrastructure, and a key distinction exists between primary storage solutions and archiving storage solutions. Primary storage is typically used as the main storage pool for computing applications during application run-time. As such, the performance of primary storage systems is very often a key challenge and a major potential bottleneck in overall application performance, since storage and retrieval of data consumes time and delays the completion of application processing. Storage systems designed for archiving applications are much less sensitive to performance constraints, as they are not part of the run-time application processing.

In general computer systems grow over their lifetime and the data under management tends to grow over the system lifetime. Growth can be exponential, and in both primary and archiving storage systems, exponential capacity growth typical in modern computing environment presents a major challenge as it results in increased cost, space, and power consumption of the storage systems required to support ever increasing amounts of information.

Existing storage solutions, and especially primary storage solutions, rely on address-based mapping of data, as well as address-based functionality of the storage system's internal algorithms. This is only natural since the computing applications always rely on address-based mapping and identification of data they store and retrieve. However, a completely different scheme in which data, internally within the storage system, is mapped and managed based on its content instead of its address has many substantial advantages. For example, it improves storage capacity efficiency since any duplicate block data will only occupy actual capacity of a single instance of that block. As another example, it improves performance since duplicate block writes do not need to be executed internally in the storage system. Existing storage systems, either primary storage systems or archiving storage systems are incapable of supporting the combination of content based storage—with its numerous advantages—and ultra-high performance.

A number of issues arise with respect to such devices, and it is necessary to consider such issues as performance, lifetime and resilience to failure of individual devices, overall speed of response and the like.

Such devices may be used in highly demanding circumstances where failure to process data correctly can be extremely serious, or where large scales are involved, and where the system has to be able to cope with sudden surges in demand.

SUMMARY

In one aspect, a method includes selecting a C-module; sending a write from a host to the selected C-module; selecting a D-module to commit a page related to the write; selecting a R-module to transmit data from the write to the target; writing the data from the write to target location; and writing the data to an address-to-hash table after acknowledgement that the data has been written to the target location and after the D-module acknowledges that the page is committed.

In another aspect, an apparatus includes electronic hardware circuitry configured to selecting a C-module; sending a write from a host to the selected C-module; selecting a D-module to commit a page related to the write; selecting a R-module to transmit data from the write to the target; writing the data from the write to target location; and writing the data to an address-to-hash table after acknowledgement that the data has been written to the target location and after the D-module acknowledges that the page is committed.

In a further aspect, an article includes a non-transitory computer-readable medium that stores computer-executable instructions. The instructions causing a machine to select a C-module; send a write from a host to the selected C-module; select a D-module to commit a page related to the write; select a R-module to transmit data from the write to the target; write the data from the write to target location; and write the data to an address-to-hash table after acknowledgement that the data has been written to the target location and after the D-module acknowledges that the page is committed.

BRIEF DESCRIPTION OF THE DRAWINGS

FIG. 5 is a flowchart of an example of a process to trip a consistency group, according to an embodiment of the disclosure.

FIG. 6 is a flowchart of an example of a process to perform increment synchronization, according to an embodiment of the disclosure.

DETAILED DESCRIPTION

Figure 1:
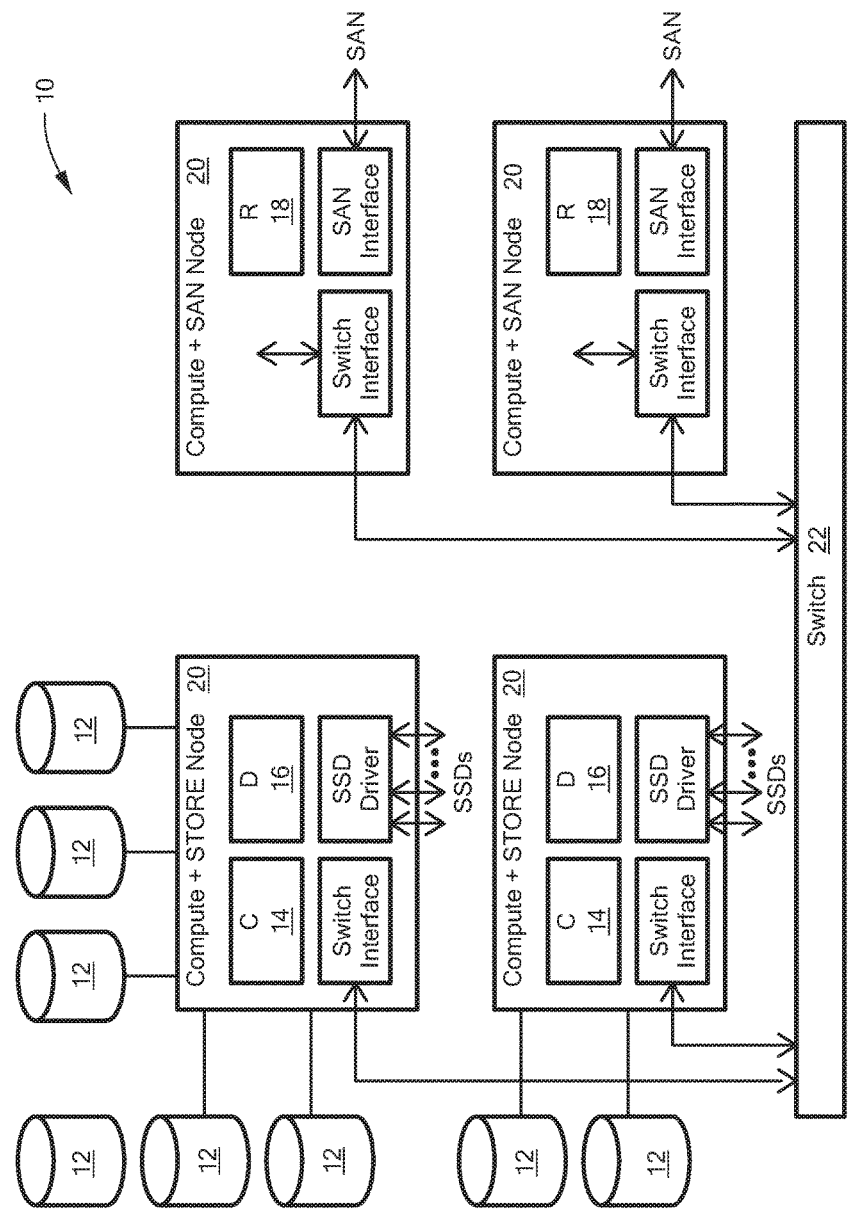
FIG. 1 is a simplified block diagram of an example of a system using content addressable storage (CAS).

In example embodiments, contents-addressable storage (CAS) arrays, volume data is stored as a combination of an address-to-hash (A2H) metadata table and a backend hash-indexed disk storage. In synchronous replication in example embodiments, a consistency group (cgroup) trip requires suspending replication, and resuming it later with an increment resynchronization, copying only data written since the cgroup trip. In one example, a cgroup trip is a management event that, in response to link issues or complete link loss, suspends replication consistently for volumes in the entire group, leaving a consistent replica on the target.

Described herein are techniques that enable taking an instantaneous snapshot of the volume state (using the A2H table) and, enable resuming replication later with copying of the hash keys written since the cgroup trip (i.e., the ones not yet transmitted). In certain embodiments, these techniques account for writes that occurred after the cgroup trip, including for inflight I/Os (e.g., I/Os in process after replication has stopped), aborted I/Os, and any other link events that may get in the way of a correct increment copy. In other embodiments, the techniques also ensure that there will not be any instances where a piece of data (i.e., a hash signature) that was written to the source volume is not in the target volume also, when the increment resynchronization process is complete. Moreover, in further embodiments, these techniques minimize the excess of data that is transmitted during the increment resynchronization, i.e., data that is already on target and does not need to be resent.

In an example embodiment CAS array, data is stored in blocks, for example of 4 KB, where each block has a unique large hash signature, for example of 20 bytes, saved on Flash memory. The examples described herein include a networked memory system. In certain embodiments, the networked memory system includes multiple memory storage units arranged for content addressable storage of data. In some embodiments, the data may be transferred to and from the storage units using separate data and control planes. In other embodiments, hashing may be used for the content addressing, and the hashing may produce evenly distributed results over the allowed input range. In certain embodiments, the hashing defines the physical addresses so that data storage, for example, may make even use of the system resources.

An example embodiment CAS array can be used to ensure that data appearing twice is stored at a single location with two pointer pointing at the single location. Hence unnecessary duplicate write operations can be identified and avoided in example embodiments. Such a feature may be included in certain embodiments of the present system as data deduplication. As well as making the system more efficient overall, it also increases the lifetime of those storage units that are limited by the number of write/erase operations. In certain embodiments, deduplication of data, meaning ensuring that the same data is not stored twice in different places, is an inherent effect of using Content-Based mapping of data to D-Modules and within D-Modules.

According to example embodiments, the separation of Control and Data may enable a substantially unlimited level of scalability, since control operations can be split over any number of processing elements, and data operations can be split over any number of data storage elements. In certain embodiments, this allows scalability in both capacity and performance, and may thus permit an operation to be effectively balanced between the different modules and nodes.

Nothing in the architecture limits the number of the different R-, C-, D-, and H-modules which are described further herein. Hence, in example embodiments of the present invention, any number of such modules can be assembled. The more modules added, the higher the performance of the system becomes and the larger the capacity it can handle. Hence scalability of performance and capacity is achieved.

Referring to FIG. 1, a system 10 is an example of a system to perform scalable block data storage and retrieval using content addressing. System 10 is architected around four main functional Modules designated R (for Router), C (for Control), D (for Data), and H (for Hash). Being modular and scalable, any specific system configuration includes at least one of R-, C-, D-, and H-modules, but may include a multiplicity of any or all of these Modules.

In particular, the system 10 includes data storage devices 12 on which the data blocks are stored. The storage devices 12 are networked to computing modules, there being several kinds of modules, including control modules 14 and data modules 16. The modules carry out content addressing for storage and retrieval, and the network defines separate paths or planes: control paths or a control plane which goes via the control modules 14 and data paths or a data plane which goes via the data modules 16.

The control modules 14 may control execution of read and write commands. The data modules 16 are connected to the storage devices and, under control of a respective control module, pass data to and/or from the storage devices. Both the C- and D-modules may retain extracts of the data stored in the storage device, and the extracts may be used for the content addressing. Typically the extracts may be computed by cryptographic hashing of the data, as will be discussed in greater detail below, and hash modules (FIG. 2) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10.

The routing modules 18 may use hash values, calculated from data associated with the operations, to select the control module 14 for the distribution. More particularly, selection of the control module 14 may use hash values, but typically relies on the user address and not on the content (hash). The hash value is, however, typically used for selecting the Data (D) module 16, and for setting the physical location for data storage within a D-module 16.

The storage devices 12 may be solid state random access storage devices, as opposed to spinning disk devices; however disk devices may be used instead or in addition.

The routing modules 18 and/or data modules 16 may compare the extracts or hash values of write data with hash values of already stored data, and where a match is found, simply point to the matched data and avoid rewriting.

The modules 14, 16, 18 are combined into nodes 20 on the network, and the nodes 20 are connected over the network by a switch 22.

In example embodiments, the use of content addressing with multiple data modules selected on the basis of the content hashing, and a finely-grained mapping of user addresses to Control Modules allow for a scalable distributed architecture.

In some examples, the system 10 may employ more than a single type of memory technology, including a mix of more than one Flash technology (e.g., single level cell—SLC flash and multilevel cell—MLC flash), and a mix of Flash and DRAM technologies. In certain embodiments, the data mapping optimizes performance and life span by taking advantage of the different access speeds and different write/erase cycle limitations of the various memory technologies.

In some examples, blocks of data are mapped internally within the system based on Content Addressing, which may be, for example, implemented through a distributed Content Addressable Storage (CAS) algorithm. For example, this scheme may map blocks of data internally according to their content, resulting in mapping of identical blocks to the same unique internal location. In some examples. the distributed CAS algorithm may allow for scaling of the CAS domain as overall system capacity grows, effectively utilizing and balancing the available computational and storage elements in order to improve overall system performance at any scale and with any number of computational and storage elements.

The examples described herein implement block storage in a distributed and scalable architecture, efficiently aggregating performance from a large number of ultra-fast storage media elements (SSDs or other), while providing in-line, highly granular block-level deduplication with no or little performance degradation.

In one example, the system 10 may include one or more of the features of a system for scalable data storage and retrieval using content addressing described in U.S. Pat. No. 9,104,326, issued Aug. 11, 2015, entitled "SCALABLE BLOCK DATA STORAGE USING CONTENT ADDRESSING," which is assigned to the same assignee as this patent application and is incorporated herein in its entirety. In other examples, the system 10 includes features used in EMC® XTREMIO®.

Figure 2:
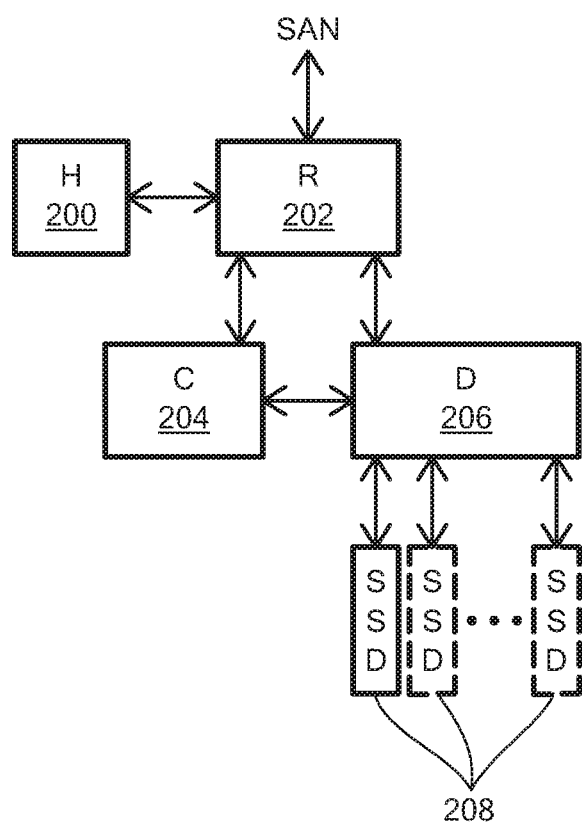
FIG. 2 is a simplified block diagram of an example of a configuration of modules of the system of FIG. 1.

Referring to FIG. 2, an example of a functional block diagram of the system 10 is the diagram 200. In FIG. 2, an H module 200 is connected to an R-module 202. The R-module is connected to both Control 204 and Data 206 modules. The data module is connected to any number of memory devices SSD 208.

A function of the R-module 202 is to terminate SAN Read/Write commands and route them to appropriate C- and D-modules, 204, 206 for execution by these Modules. By doing so, the R Module 202 can distribute workload over multiple C- and D-modules 204, 206, and at the same time create complete separation of the Control and Data planes, that is to say provide separate control and data paths.

A function of the C-module 204 is to control the execution of a Read/Write command, as well as other storage functions implemented by the system. It may maintain and manage key metadata elements.

A function of the D-module 206 is to perform the actual Read/Write operation by accessing the storage devices 208 (designated SSDs) attached to it. The D module 206 may maintain metadata related with the physical location of data blocks.

A function of the H-module 200 is to calculate the Hash function value for a given block of data.

Figure 3:
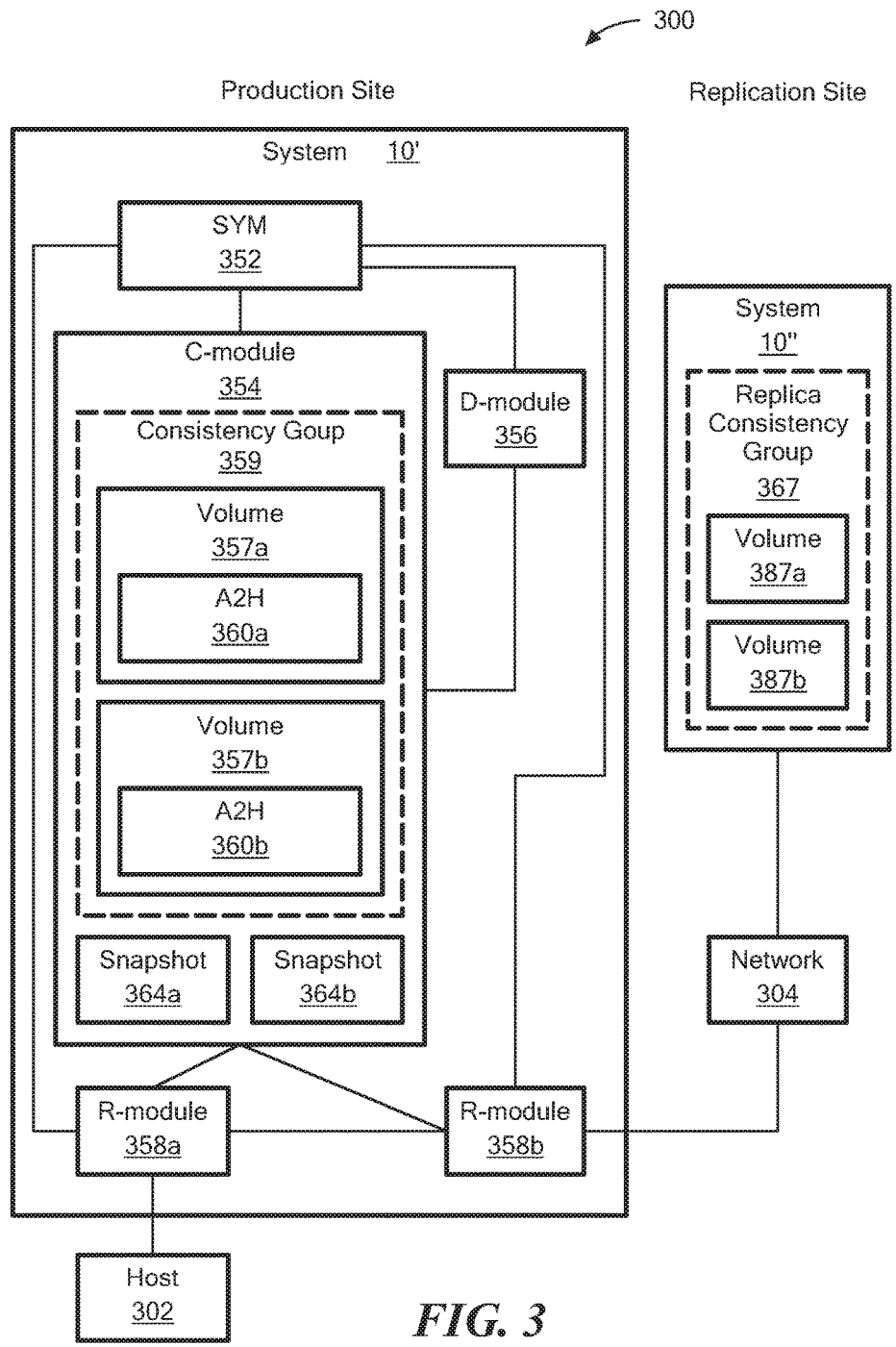
FIG. 3 is a simplified block diagram of an example of a data protection system using CAS, according to an embodiment of the disclosure.

Referring to FIG. 3, the system 10 can be a system 10' used for production and system 10 can also be a system 10" used for replication, according to an embodiment of the disclosure. An example of a replication system is a replication system 300. The replication system 300 includes a host 302 and the system 10' at a production site and a system 10" connected to the system 10' at replication site by a network 304. In this configuration example, data is replicated from the system 10' to the system 10". The system 10' includes a system management module (SYM) 352, a C-module 354, a D-module 356, an R-module 358a and an R-module 358b.

The C-module 354 includes a volume 357a with an address-to hash (A2H) table 360a; and a volume 357b with an A2H table 360b that form a consistency group 359. As will be further described herein the C-module includes snapshots 364a, 364b corresponding to volumes 357a and 357b, respectively.

As will be further described herein the system 10", a replica CG 367 includes a volume 387a which is a replica of volume 357a and a volume 387b which is a replica of volume 357b.

Figure 4:
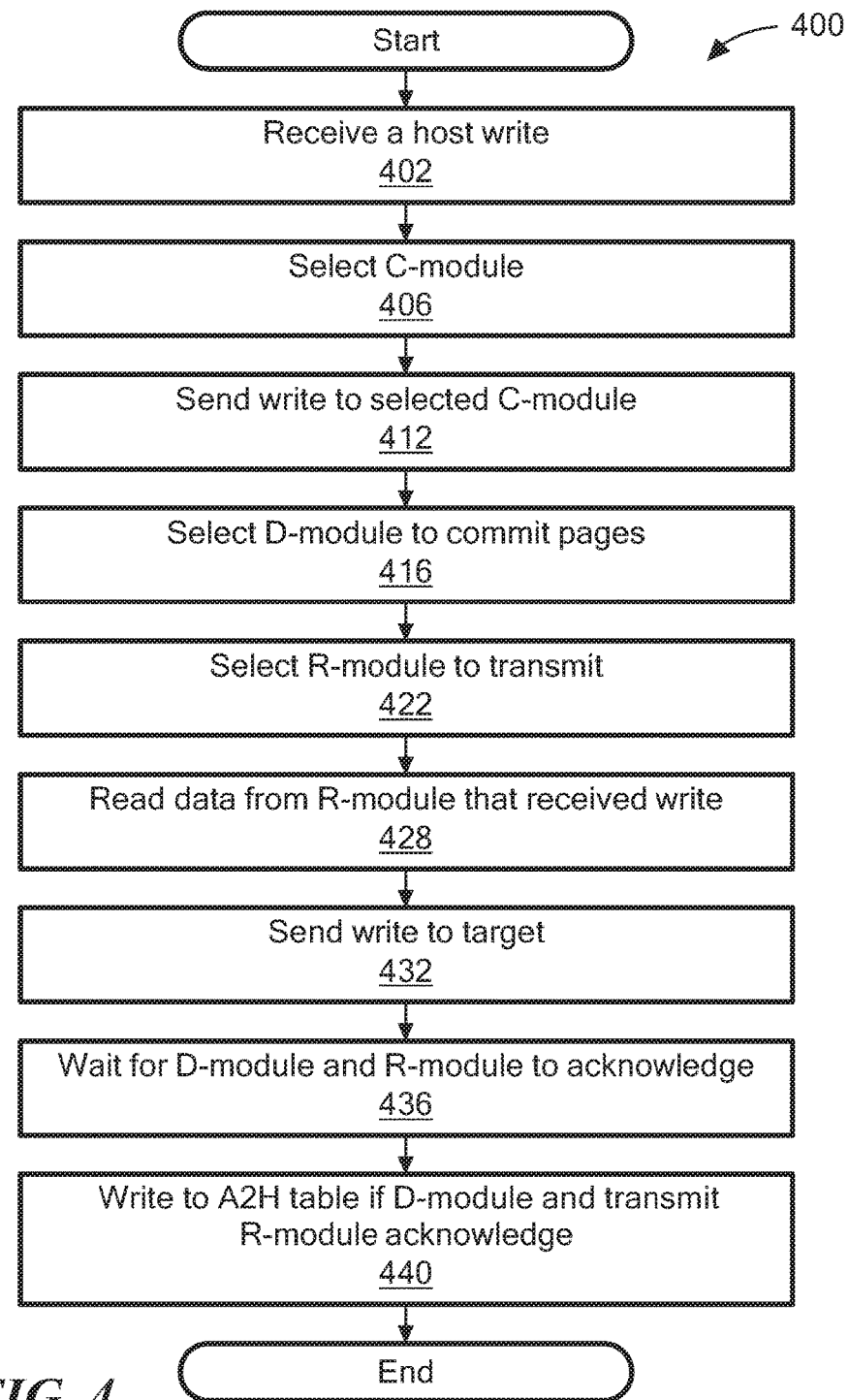
FIG. 4 is a flowchart of an example of a process to perform a write, according to an embodiment of the disclosure.

Referring to FIG. 4, a process 400 is an example of a process to perform a write in the replication system 300 in the production site, according to an embodiment of the disclosure. As will be further described herein process 400 contributes to a simplified resynchronization in the event of loss of synchronization between the production site and the replication site.

Process 400 receives a host write (402). For example, the host 302 writes to the system 10' and the host write is received into a data page in memory by the R-module 358a.

Process 400 selects C-module (406) and sends write to selected C-module (412). For example, the R-module 358a selects the C-module 354 and sends the write command to the C-module 354.

Process 400 selects D-module to commit pages (416). For example, the C-module 354 selects the D-module 356 to commit the data page to disk.

Process 400 selects R-module to transmit (422). For example, the C-module 354 checks whether the write is to a synchronous replicated consistency group, and if so selects an R-module 358b to transmit the write to the target volume (e.g., either replica volumes 387a or replica volume 387b), sends a "transmit data" command to that R-module 358b, and waits for a response.

Process 400 reads data from R-module that received write from host (428). For example, the R-module 358b reads the data from the original R-module 358a. If the process 400 in processing block 422 is the R-module that received the host writes then this processing block is not needed.

Process 400 sends write to target (432). For example, the R-module 358b transmits the write to the target volume (e.g., either volumes 387a or volume 387b) for execution.

Process 400 waits for acknowledgement from the D-module and the R-module that transmitted the write (436). For example, the C-module 354 waits for the D-module 356 to acknowledge that the page was committed to disk and the R-module 358b to acknowledge that the write was written to the target volume (e.g., either volumes 387a or volume 387b).

Process 400 writes to the address-to-hash table if the D-module and the R-module acknowledge (440). For example, the C-module 354 updates the A2H 360 after the D-module 356 acknowledges that the page was committed to disk and the R-module 358b acknowledges that the write was written to the target volume (e.g., either volumes 387a or volume 387b).

Waiting for acknowledgement from the R-module before writing to the A2H table is important because if there is a link failure (e.g., between the production site and the replication site) there is certainty that the data committed to the A2H table has already replicated to the target volume. This makes recovery easier, and the performance penalty of not updating A2H in parallel with the replicating is small. Note that persisting the data to the backend is performed in parallel to transmitting data remotely; thus, the only additional delay is the A2H update, which is very small.

In example embodiments, a cgroup trip may be triggered by either a request from a C-module that is unable to transmit data to the target or a SYM Link monitoring component can decide to trip a cgroup if all the links are either down or are too slow.

In certain embodiments, after a cgroup trip, when the local (e.g., CG 359) and remote copy (CG 367) are out of sync and a replication is being re-established, the re-sync operation should not involve a full copy of the cgroup because it takes too much time to copy entire volumes of data. For example, a full resynchronization of a 4 TB volume with 4 KB page size may involve copying 1 billion page copy operations, and take hours to complete. Instead, in example embodiments, only the data that was written since the local and remote were last in sync, should be copied (including data that was inflight (inflight I/Os) when the cgroup trip occurred).

In some embodiments, once a C-module receives a transmit error from an R-module, it tries to send the request to the next R-module on a list of available transmit R-modules, i.e., a list of R-modules with links to the target storage array. In certain embodiments, if all the links fail or if the write operation fails on the replication side, or if the C-module ran out of time for retries, the C-module receiving the error is responsible for notifying the SYM module. In some embodiments, the SYM module in turn trips the cgroup and posts an alert that the cgroup is no longer equal to its replica. In certain embodiments, the replication pair (source-target) enters an asynchronous replication state, where it collects the data that will be needed for resynchronization once the problem is fixed.

In one example the I/O in the C module is not completed until the cgroup trip occurs. Once the trip occurs and replication has been suspended, a good status is sent to the host for the I/O.

Referring to FIG. 5, a process 500 is an example of a process to trip a consistency group, according to an embodiment of the disclosure. In one example, the process 500 is performed by the SYM module 352. Process 500 instructs C-modules to stop acknowledging writes from the host (502). For example, the SYM module 352 instructs the C-module 354 to stop acknowledging writes from the host 302.

Process 500 instructs the C-modules to take a snapshot of the consistency group (508). For example, the SYM module 352 instructs the C-module 354 to take snapshots 364a, 364b of volumes 357a, 357b respectively in a consistency group 359. The snapshots 364a, 364b contain data that has been verified to exist on the replica volumes 387a, 387b respectively. Any data whose transmission was aborted or incomplete is not in the snapshot.

Process 500 notifies C-modules to stop replication (512). For example, the SYM module 352 instructs the C-module 354 to replicate the consistency group 359.

Process 500 makes indication that replication has stopped for the consistency group (522). For example, the SYM module 352 sends an alert indicating that replication has stopped for the consistency group and/or that the source and target are no longer synchronized.

Referring to FIG. 6, a process 600 is an example of a process to perform increment resynchronization, according to an embodiment of the disclosure. Process 600 sends a command to C-Modules to perform increment synchronization (602). For example, the SYM module 352 sends a command to the C-modules 354 to perform synchronization of the volumes in the consistency group.

Process 600 compares volume with snapshot (606). For example, the C-Modules on the production site compare each of the volumes of the consistency group to the snapshot of the consistency group performed in processing block 508 in process 500.

For example, process 600 sends corresponding data pages from source to target of any volume data different from the snapshot data (612). For example, any data in the volume at the source different from the snapshot is sent to the respective target volume by sending the corresponding data pages from the D-Module to the target volume (e.g., one of replica volume 387a and replica volume 387b).

Figure 7:
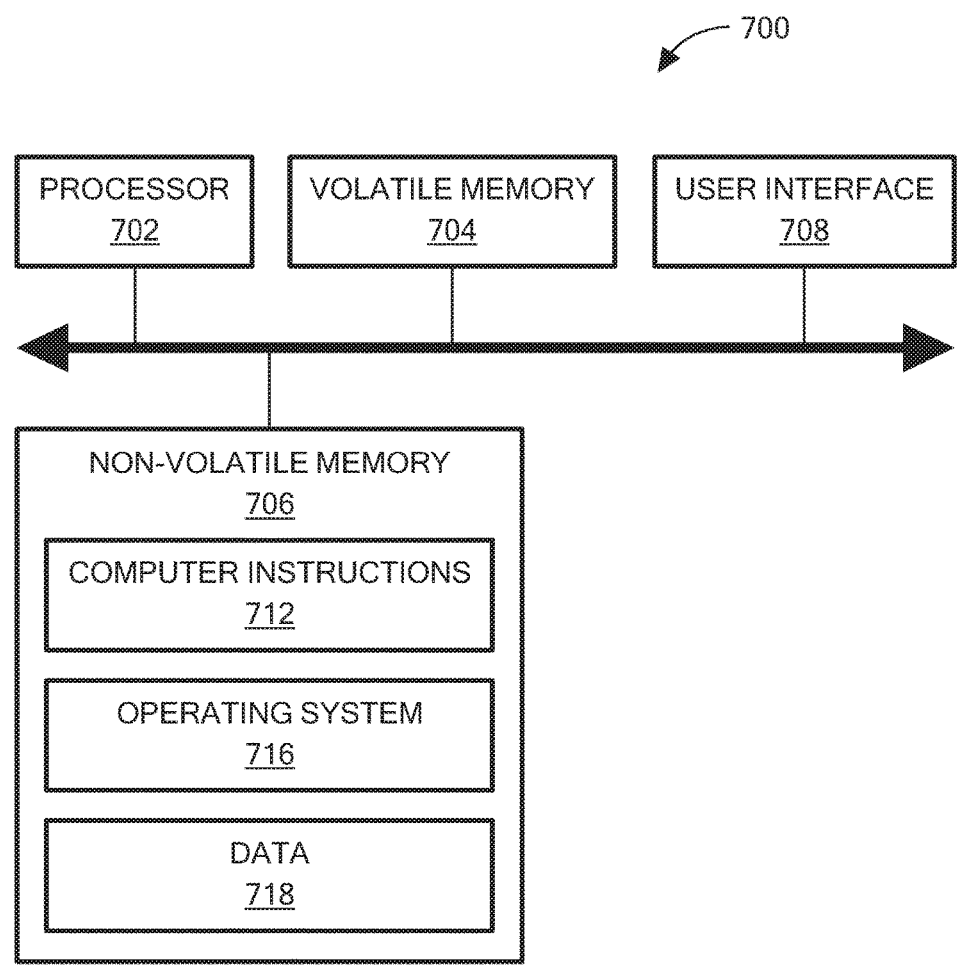
FIG. 7 is a computer on which all or part of the processes of FIGS. 4 to 6 may be implemented, according to an embodiment of the disclosure.

Referring to FIG. 7, in one example, a computer 700 includes a processor 702, a volatile memory 704, a non-volatile memory 706 (e.g., hard disk, flash disks and so forth) and the user interface (UI) 708 (e.g., a graphical user interface, a mouse, a keyboard, a display, touch screen and so forth), according to an embodiment of the disclosure. The non-volatile memory 706 stores computer instructions 712, an operating system 716 and data 718. In one example, the computer instructions 712 are executed by the processor 702 out of volatile memory 704 to perform all or part of the processes described herein (e.g., processes 400, 500 and 600).

The processes described herein (e.g., processes 400, 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 500 and 600 are not limited to the specific processing order of FIGS. 4 to 6, respectively. Rather, any of the processing blocks of FIGS. 4 to 6 may be re-ordered, combined or removed, performed in parallel or in serial, as necessary, to achieve the results set forth above.

The processing blocks (for example, in the processes 400, 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method for storing data in a computer based data storage system, the computer based data storage system comprising a first storage subsystem and a second storage subsystem, the first storage subsystem being configured to store data in a consistency group of the first storage subsystem, and replicate the consistency group to the second storage subsystem, the method comprising:
   receiving, at the first storage subsystem, a request to write a data payload;
   storing the data payload in the consistency group of the first storage subsystem, the storing being performed by a module in the first storage subsystem;
   initiating, by the module, a replication of the data payload to the second storage subsystem;
   stopping all replication of the consistency group to the second storage subsystem in response to detecting that the replication of the data payload is unsuccessful;
   synchronizing the first storage subsystem with the second storage subsystem; and
   updating, by the module, at least one address-to-hash (A2H) table in the first storage subsystem to identify an address associated with the data payload after the first storage subsystem and the second storage subsystem are synchronized,
   wherein the module is configured to update the A2H table after: (i) the data payload has been stored in the consistency group of the first storage subsystem, and (ii) the module has received an acknowledgment that the data payload has been successfully replicated to the second storage subsystem.

2. The method of claim 1, wherein stopping all replication of the consistency group includes:
   instructing the module to stop acknowledging write requests;
   instructing the module to take a snapshot of the consistency group; and
   notifying the module to stop the replication of the consistency group to the second storage subsystem.

3. The method of claim 2, wherein synchronizing the first storage subsystem with the second storage subsystem includes:
   comparing data that is currently stored in the consistency group with the snapshot; and
   sending any data that is currently stored in the consistency group and not identified in the snapshot to the second storage subsystem.

4. An apparatus for synchronous replication in a computer based data storage system, comprising:
   one or more storage devices configured to implement a consistency group; and
   electronic hardware circuitry that is operatively coupled to the one or more storage devices, the electronic hardware circuitry being configured to:
   receive a request to write a data payload;
   store the data payload in the consistency group;
   initiate a replication of the data payload to a replication subsystem;
   stop all replication of the consistency group to the replication subsystem in response to detecting that the replication of the data payload is unsuccessful;
   synchronize the consistency group with a replica of the consistency group that is stored at the replication subsystem; and
   update at least one address-to-hash (A2H) table in the first storage subsystem to identify an address associated with the data payload after the consistency group is synchronized with the replica of the consistency group, wherein the A2H table is updated after: (i) the data payload has been stored in the consistency group, and (ii) the data payload has been successfully replicated to the replication subsystem.

5. The apparatus of claim 4, wherein the electronic hardware circuitry comprises at least one of a processor, a memory, a programmable logic device or a logic gate.

6. The apparatus of claim 4, further comprising taking a snapshot of the consistency group when the replication of the consistency group is stopped.

7. The apparatus of claim 6, wherein synchronizing the consistency group with the replica of the consistency group includes:
   comparing data that is currently stored in the consistency group with the snapshot; and
   sending any data that is currently stored in the consistency group and not identified in the snapshot to the replication subsystem.

8. A non-transitory computer-readable medium storing one or more processor-executable instructions, which executed by one or more processors, cause the one or more processors to perform a method for storing data in a computer based data storage system, the computer based data storage system comprising a first storage subsystem and a second storage subsystem, the first storage subsystem being configured to store data in a consistency group of the first storage subsystem, and replicate the consistency group to the second storage subsystem, the method comprising:
   receiving, at the first storage subsystem, a request to write a data payload;
   storing the data payload in the consistency group of the first storage subsystem, the storing being performed by a module in the first storage subsystem;
   initiating, by the module, a replication of the data payload to the second storage subsystem;
   stopping all replication of the consistency group to the second storage subsystem in response to detecting that the replication of the data payload is unsuccessful;
   synchronizing the first storage subsystem with the second storage subsystem; and
   updating, by the module, at least one address-to-hash (A2H) table in the first storage subsystem to identify an address associated with the data payload after the first storage subsystem and the second storage subsystem are synchronized,
   wherein the module is configured to update the A2H table after: (i) the data payload has been stored in the consistency group of the first storage subsystem, and (ii) the module has received an acknowledgment that the data payload has been successfully replicated to the second storage subsystem.

9. The non-transitory computer-readable medium of claim 8, wherein stopping all replication of the consistency group includes:
  instructing the module to stop acknowledging write requests;
  instructing the module to take a snapshot of the consistency group; and
  notifying the module to stop the replication of the consistency group to the second storage subsystem.

10. The non-transitory computer-readable medium of claim 9, wherein synchronizing the first storage subsystem with the second storage subsystem includes:
  comparing data that is currently stored in the consistency group with the snapshot; and
  sending any data that is currently stored in the consistency group and not identified in the snapshot to the second storage subsystem.

\* \* \* \* \*